United States Patent
Li et al.

(10) Patent No.: US 11,673,839 B1
(45) Date of Patent: Jun. 13, 2023

(54) TEN-MEMBERED FERGUSONITE STRUCTURE HIGH-ENTROPY OXIDE CERAMIC AND PREPARATION METHOD THEREOF

(71) Applicant: GUILIN UNIVERSITY OF TECHNOLOGY, Guilin (CN)

(72) Inventors: Chunchun Li, Guilin (CN); Deqin Chen, Guilin (CN); Hongxiang Xiao, Guilin (CN); Guobin Zhu, Guilin (CN); Qinghua Shen, Guilin (CN); Laijun Liu, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 0 days.

(21) Appl. No.: 18/098,207

(22) Filed: Jan. 18, 2023

(30) Foreign Application Priority Data

Apr. 8, 2022 (CN) .......................... 202210366874.3

(51) Int. Cl.
*C04B 35/50* (2006.01)
*C04B 35/505* (2006.01)
(Continued)

(52) U.S. Cl.
CPC ............ *C04B 35/50* (2013.01); *C04B 35/624* (2013.01); *C04B 35/6261* (2013.01);
(Continued)

(58) Field of Classification Search
CPC ...... C03B 35/50; C03B 35/505; C03B 35/495
See application file for complete search history.

(56) References Cited

FOREIGN PATENT DOCUMENTS

| CN | 109534814 A | 3/2019 |
| CN | 110698201 A | 1/2020 |

(Continued)

OTHER PUBLICATIONS

Qin, et al. "21-Component compositionally complex ceramics: Discovery of ultrahigh-entropy weberite and fergusonite phases and a pyrochlore—weberite transition" Journal of Advanced Ceramics 2022, 11(4): 641-655.

(Continued)

*Primary Examiner* — Karl E Group
(74) *Attorney, Agent, or Firm* — Mayer & Williams, PC; Stuart H. Mayer (57) ABSTRACT

Disclosed are a ten-membered fergusonite structure high-entropy oxide ceramic and a preparation method thereof, where the high-entropy oxide ceramic has a monoclinic structure, with a chemical formula of $RENbO_4$, and the RE is any ten rare-earth cations selected from a group consisting of $La^{3+}$, $Ce^{3+}$, $Pr^{3+}$, $Nd^{3+}$, $Sm^{3+}$, $Eu^{3+}$, $Gd^{3+}$, $Dy^{3+}$, $Ho^{3+}$, $Er^{3+}$, $Tm^{3+}$, $Yb^{3+}$, $Lu^{3+}$ and $Y^{3+}$. The ten rare-earth cations have a molar ratio of 1:1:1:1:1:1:1:1:1:1 and equal share of RE position. According to the application, by adopting solid state reaction, the fergusonite structure high-entropy oxide ceramic with single-phase structure, uniform element distribution and stable phase is obtained. The high-entropy oxide ceramic prepared by the application is simple in process, uniform in chemical composition and microstructure, and convenient to realize on-demand regulation on properties through a combination of different elements.

7 Claims, 6 Drawing Sheets

(51) Int. Cl.
*C04B 35/495* (2006.01)
*C04B 35/626* (2006.01)
*C04B 35/624* (2006.01)
*C04B 41/48* (2006.01)
*C04B 41/83* (2006.01)
*C04B 41/00* (2006.01)

(52) U.S. Cl.
CPC .... *C04B 35/62655* (2013.01); *C04B 41/0072* (2013.01); *C04B 41/4869* (2013.01); *C04B 41/83* (2013.01); *C04B 2235/3224* (2013.01); *C04B 2235/606* (2013.01); *C04B 2235/6583* (2013.01)

(56) References Cited

FOREIGN PATENT DOCUMENTS

| CN | 111533557 A | 8/2020 |
|---|---|---|
| CN | 112679213 A | 4/2021 |
| CN | 112830782 A | 5/2021 |
| CN | 112897989 A | 6/2021 |
| CN | 113620722 A | 11/2021 |
| CN | 113816751 A | 12/2021 |
| CN | 114058923 A | 2/2022 |
| CN | 115073174 A * | 9/2022 |
| KR | 20210068250 A | 6/2021 |
| RU | 2746673 C1 | 4/2021 |
| WO | 2013177678 A1 | 12/2013 |
| WO | 2020142125 A1 | 7/2020 |

OTHER PUBLICATIONS

Zhu et al. "Enhanced mechanical and thermal properties of ferroelastic high-entropy rare-earth-niobates" Scripta Materialia 200 (2021) 113912.

Wright et al. "Single-phase duodenary high-entropy fluorite/pyrochlore oxides with an order-disorder transition" Acta Materialia 211 (2021) 116858.

Yang, "Review and Perspective on Oxidation Resistance of High-Entropy Alloys" Materials Report, 2019, vol. 33, No. Z2.

Luo, "Research Progress of High-Entropy Thermal Barrier Coatings Ceramic Materials" [J]. Aeronautical Manufacturing Technology, 2022, 65(3): 82-91.

* cited by examiner

TEN-MEMBERED FERGUSONITE STRUCTURE HIGH-ENTROPY OXIDE CERAMIC AND PREPARATION METHOD THEREOF

CROSS-REFERENCE TO RELATED APPLICATIONS

This application claims priority to Chinese Patent Application No. 202210366874.3, filed on Apr. 8, 2022, the contents of which are hereby incorporated by reference.

TECHNICAL FIELD

The present application relates to the technical field of high-entropy oxide materials, and in particular to a ten-membered fergusonite structure high-entropy oxide ceramic and a preparation method thereof.

BACKGROUND

The concept of "high entropy" was first put forward by Yeh et al. in the preparation of high-entropy alloys in 2004 (J. W. Yeh, S. K. Chen, S. J. Lin, et al., Nanostructured high-entropy alloys with multiple principal elements: novel alloy design concepts and outcomes, Advanced Engineering Materials, 6, (2004), 299-303.). The successful preparation of high-entropy alloys promotes the development of high-entropy ceramics. In 2015, Rost et al. reported the successful preparation of high-entropy ceramics (HECs) for the first time (C. M. Rost, E. Sachet, T. Borman, et al., Entropy-stabilized oxides, Nature Communications, 6, (2015), 8485-8492.). According to the structure, high-entropy ceramics is a solid solution formed by one or more Wyckoff positions in inorganic nonmetallic compounds occupied by multiple atoms in equal or nearly equal proportions. At present, the reported high-entropy oxides mainly include rock salt, fluorite, perovskite and spinel oxides, as well as borides, carbides, nitrides and silicides.

The unique high-entropy effect, lattice distortion, sluggish diffusion and "cocktail" effect of high-entropy ceramics are the main factors for the excellent properties of materials. Because of wide application in thermal barrier coating materials, microelectronic barrier layers and dielectric materials, the high-entropy ceramics have attracted much attention. Among them, (Mg, Co, Ni, Cu, Zn)O system is a typical representative of rock salt structure, and Rost et al. found that it forms a single-phase rock salt structure solid solution when the heat treatment temperature is higher than 875° C. Zeng et al. prepared $(La_{0.2}Nd_{0.2}Sm_{0.2}Gd_{0.2}Er_{0.2})_2Zr_2O_7$ fluorite-type high-entropy transparent ceramics through vacuum sintering, in which with the increase of sintering temperature, the bulk density and grain size of fluorite-type high-entropy transparent ceramics increase (J. J. Zeng, K. B. Zhang, D. M. Chen, et al. Preparation of $(La_{0.2}Nd_{0.2}Sm_{0.2}Gd_{0.2}Er_{0.2})_2Zr_2O_7$ high-entropy transparent ceramics by vacuum sintering [J]. Journal of Inorganic Materials, 36, (2021), 418-424.). Yang et al. prepared $(Bi_{0.2}Na_{0.2}K_{0.2}La_{0.2}Sr_{0.2})TiO_3$ perovskite-type A-site high-entropy ceramics by sol-gel method (W. T. Yang, G. P. Zheng, High energy storage density and efficiency in nanostructured $(Bi_{0.2}Na_{0.2}K_{0.2}La_{0.2}Sr_{0.2})TiO_3$ high-entropy ceramics, Journal of the American Ceramic Society, 105, (2021), 1083-1094.). Recently, Xie et al. prepared $(La_{0.2}Pr_{0.2}Nd_{0.2}Sm_{0.2}Eu_{0.2})_2Ce_2O_7$ system high-entropy ceramics by solid state reaction (H. H. Xie, J. S. Li, S. Z. Yang, et al., Microstructures and dielectric properties of novel $(La_{0.2}Pr_{0.2}Nd_{0.2}Sm_{0.2}Eu_{0.2})_2Ce_2O_7$ high entropy ceramics, Journal of Materials Science: Materials in Electronics, 32, (2021), 27860-27870.). Chen et al. successfully prepared $(Zr_{0.2}Hf_{0.2}Ti_{0.2}Nb_{0.2}Ta_{0.2})C$ high porosity high-entropy carbide ceramics by in-situ synthesis (H. Chen, H. M. Xiang, F. Z. Dai, et al., High porosity and low thermal conductivity high entropy $(Zr_{0.2}Hf_{0.2}Ti_{0.2}Nb_{0.2}Ta_{0.2})C$, Journal of Materials Science & Technology, 35, (2019), 1700-1705.high-entropy).

The rare-earth niobate $RENbO_4$ at room temperature belongs to fergusonite structure, and the rare-earth atom is located in the center of $REO_8$ dodecahedron, showing an 8-coordination structure; Nb is located in the center of $NbO_4$ tetrahedron, which has a 4-coordination structure, and $NbO_4$ tetrahedron shares a layered structure. Because of unique crystal structure, stable chemical properties and excellent thermodynamic properties, fergusonite has been widely used in luminescent materials, thermal barrier coating materials, wear-resistant and corrosion-resistant materials and dielectric materials, etc. The high-entropy strategy of rare-earth niobate makes the material obtain the excellent performance of both at the same time, the solid solution of a variety of rare-earth elements in A-site complements the properties of the material, and the on-demand regulation on material properties is realized.

At present, the research on fergusonite structure high-entropy oxide ceramics is very limited, and rare-earth niobate is irreplaceable in the fields of optics, thermodynamics and electricity. The research of high-entropy ceramics mostly focuses on the high-entropy of eight elements or less. The increase of configuration entropy is beneficial to improve the solid solubility, so as to improve the selection of single-phase solid solution with simple crystal structure and keep the system stable. The high-entropy effect, lattice distortion, sluggish diffusion and "cocktail" effect caused by high-entropy are the important factors affecting the properties of materials. The superposition of multiple effects complicates the regulation of properties, and the relationship between the four effects and properties has not been deeply studied. Therefore, it is necessary to further study the mechanism of improving the configuration entropy as property. At the same time, it is necessary to further expand the combination of rare-earth niobate and high-entropy oxide ceramics, so as to improve the properties of the materials and meet more special use requirements.

SUMMARY

The objectives of the application are to provide a ten-membered fergusonite structure high-entropy oxide ceramic and a preparation method thereof To achieve the above objectives, the present application provides the following solutions.

The present application provides the ten-membered fergusonite structure high-entropy oxide ceramic, with a chemical formula of $RENbO_4$. The high-entropy oxide ceramic has a monoclinic structure, the RE is any ten rare-earth cations selected from a group consisting of $La^{3+}$, $Ce^{3+}$, $Pr^{3+}$, $Nd^{3+}$, $Sm^{3+}$, $Eu^{3+}$, $Gd^{3+}$, $Dy^{3+}$, $Ho^{3+}$, $Er^{3+}$, $Tm^{3+}$, $Yb^{3+}$, $Lu^{3+}$ and $Y^{3+}$, and the ten rare-earth cations have a molar ratio of 1:1:1:1:1:1:1:1:1:1 (a mole number of each rare-earth element is preferably 0.1 mol) and equal share of RE position.

The application provides a preparation method of the ten-membered fergusonite structure high-entropy oxide ceramic, including following steps:

(1) weighing and proportioning raw material powders of rare-earth oxide $RE_2O_3$ and $Nb_2O_5$ with a purity of over 99.9% (by weight percentage) according to a composition of the RENbO4;

(2) mixing the raw materials in step (1) by wet ball milling, drying and pre-sintering for 6-10 hours at atmospheric atmosphere of 1225° C-1250° C. to obtain powders; and (3) adding binder to the powders prepared in step (2) for granulation and dry pressing and molding, and finally sintering for 2-6 hours in atmospheric atmosphere of 1300° C-1400° C. to obtain the ten-membered fergusonite structure high-entropy oxide ceramic with single-phase structure, uniform element distribution, and stable phase.

Optionally, in step (2), a ball milling time is 6 hours, and ball milling mediums are absolute ethanols.

Optionally, in step (3), the binder accounts for 3% of the total mass of the powders prepared in step (2).

Optionally, the binder is polyvinyl alcohol (PVA) with a mass concentration of 5%.

Optionally, equipment for the dry pressing and molding is a uniaxial hydraulic press, and a molding pressure is 50-80 MPa.

Optionally, the pre-sintering in step (2) and the sintering in step (3) are both carried out in a muffle furnace.

The chemical reactions involved in the application are as follows:

where RE is any ten rare-earth cations selected from a group consisting of $La^{3+}$, $Ce^{3+}$, $Pr^{3+}$, $Nd^{3+}$, $Sm^{3+}$, $Eu^{3+}$, $Gd^{3+}$, $Dy^{3+}$, $Ho^{3+}$, $Er^{3+}$, $Tm^{3+}$, $Yb^{3+}$, $Lu^{3+}$ and $Y^{3+}$, and a difference of ion radius is close to 15%, satisfying necessary conditions for forming a solid solution.

According to the application, the fergusonite high-entropy oxide ceramic material is prepared by a conventional solid state reaction method, and a proper heat treatment process plays a major role in the crystal structure and phase transformation of the material. Under the condition of thermal excitation, energy is provided for the chemical reaction and the solid solution of multiple elements, and rare-earth cations accelerate the diffusion to form a new arrangement of $REO_8$ dodecahedron, which is conducive to forming uniform phase distribution. The variety of solid solution elements increases, and the configuration entropy of the system increases. The increase of entropy is beneficial to forming single-phase compounds and keeping the stability of the phase, but when there are more than ten kinds of elements, the increase of entropy changes very slowly. According to the application, through a series of heat treatment process explorations, the fergusonite structure high-entropy oxide ceramic with uniform phase structure, uniform element distribution, and stable phase is obtained.

The application discloses the following technical effects.

According to the application, by introducing ten kinds of rare-earth metal cations with equal molar ratio to carry out high-entropy on the fergusonite structure niobate ceramics, the fergusonite structure high-entropy oxide ceramics with uniform phase structure, uniform element distribution, and stable phase are prepared by solid state reaction. The high-entropy oxide ceramic prepared by the application is simple in process, uniform in chemical composition and microstructure, and convenient to realize on-demand regulation of properties through a combination of different elements.

BRIEF DESCRIPTION OF THE DRAWINGS

In order to more clearly explain the embodiments of the present application or the technical solutions in the prior art, the following will briefly introduce the drawings needed in the embodiments. Obviously, the drawings in the following description are only some implementations of the present application. For those of ordinary skill in this field, other drawings may be obtained according to these drawings without creative labor.

DETAILED DESCRIPTION OF THE EMBODIMENTS

Now various exemplary embodiments of the present application will be described in detail. This detailed description should not be considered as a limitation of the present application, but should be understood as a more detailed description of some aspects, characteristics and embodiments of the present application.

It should be understood that the terms described in the present application are only used to describe specific embodiments, and are not used to limit the application. In addition, for the numerical range in the present application, it should be understood that each intermediate value between the upper limit and the lower limit of the range is also specifically disclosed. Any stated value or intermediate value within the stated range, and any other stated value or intermediate value within the stated range are also included in the present application. The upper and lower limits of these smaller ranges can be independently included or excluded from the range.

Unless otherwise stated, all technical and scientific terms used herein have the same meanings commonly understood by those of ordinary skill in the field to which this application relates. Although the present application only describes preferred methods and materials, any methods and materials similar or equivalent to those described herein may be used in the practice or testing of the present application. All references mentioned in this specification are incorporated by reference to disclose and describe the methods and/or materials related to the references. In case of conflict with any incorporated references, the contents of this specification shall prevail.

Without departing from the scope or spirit of the present application, it is obvious to those skilled in the art that many modifications and changes may be made to the specific embodiments of the present specification. Other practical ways obtained from the description of the present application are obvious to the skilled person. The description and embodiment of the present application are only exemplary.

As used in this paper, the terms "comprising", "including", "having" and "containing" are all open terms, meaning including but not limited to.

Embodiment 1

A-site ten-membered high-entropy fergusonite high-entropy oxide ceramic material, with a chemical formula of (La, Nd, Sm, Eu, Gd, Dy, Ho, Y, Yb, Lu)NbO$_4$, and a preparation method thereof, including following steps:

(1) weighing and proportioning raw material of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ and Nb$_2$O$_5$ with a purity of over 99.9% according to a composition of (La, Nd, Sm, Eu, Gd, Dy, Ho, Y, Yb, Lu)NbO$_4$, where a molar ratio of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ is 1:1:1:1:1:1:1:1:1:1;

(2) mixing the raw materials in step (1) by wet ball milling for 6 hours, with absolute ethanol as a ball milling medium, drying and pre-sintering for 8 hours at atmospheric atmosphere 1250° C. to obtain powders; and (3) adding binder to the powders prepared in step (2) for granulation and dry pressing and molding, and finally sintering at the atmospheric atmosphere of 1350° C. for 4 hours, where the binder is a polyvinyl alcohol solution with a mass concentration of 5%, and an addition amount of the polyvinyl alcohol accounts for 3% of a total mass of the powders.

Figure 1:
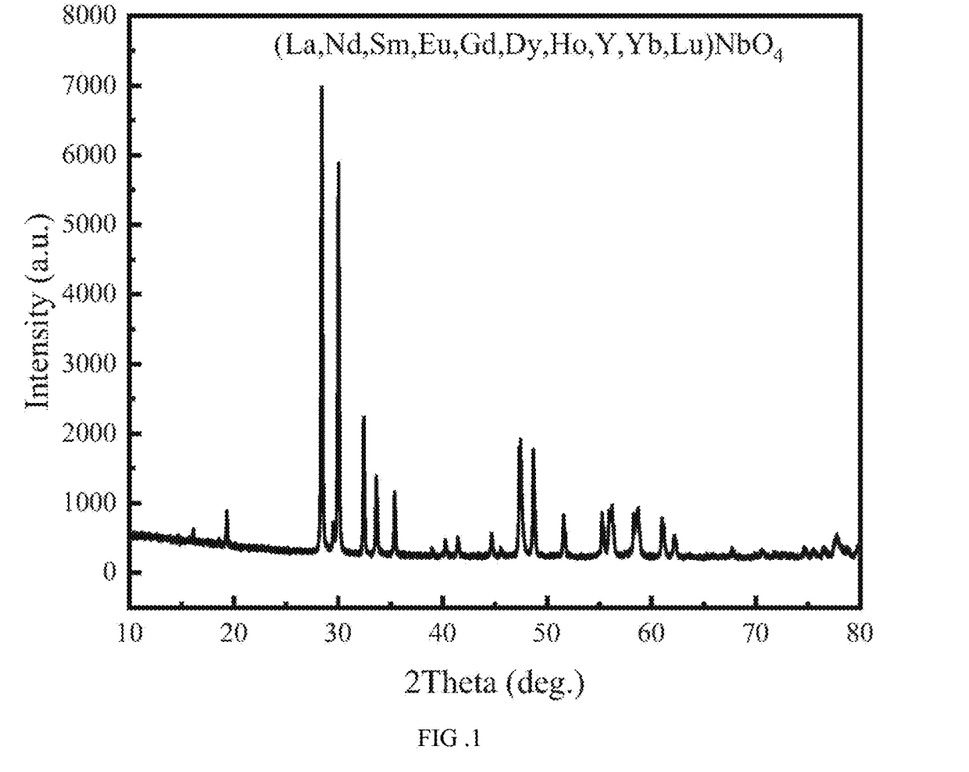
FIG. 1 is an X-ray diffraction (XRD) pattern of (La, Nd, Sm, Eu, Gd, Dy, Ho, Y, Yb, Lu)NbO$_4$ high-entropy oxide ceramic material in embodiment 1.
Figure 2:
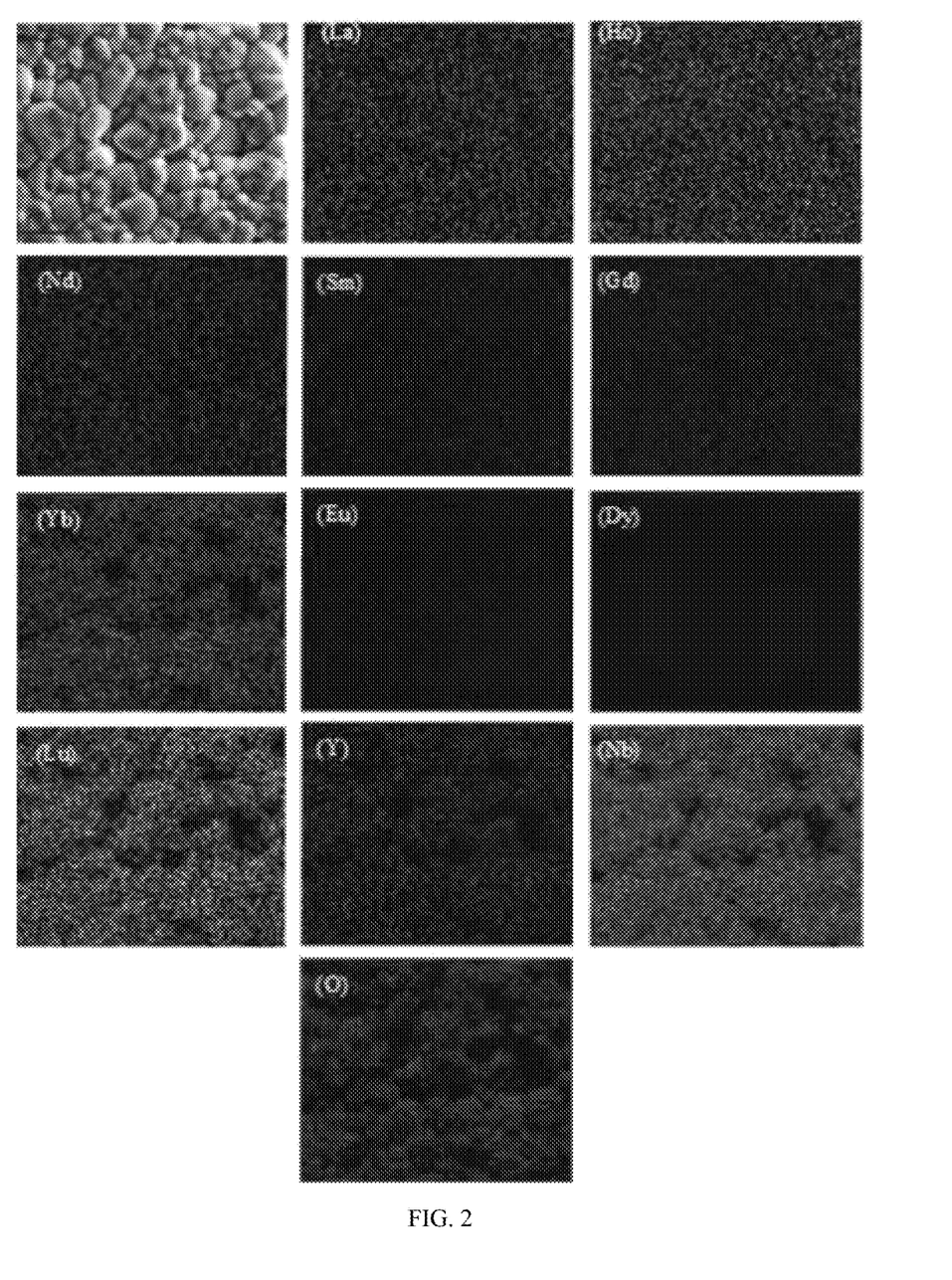
FIG. 2 shows a scanning electron microscope (SEM) morphology and elemental energy spectrum analysis results of (La, Nd, Sm, Eu, Gd, Dy, Ho, Y, Yb, Lu)NbO$_4$ high-entropy oxide ceramic material in embodiment 1.

An X-ray diffraction (XRD) pattern of (La, Nd, Sm, Eu, Gd, Dy, Ho, Y, Yb, Lu)NbO$_4$ high-entropy oxide ceramic material prepared in embodiment 1 is shown in FIG. 1, and FIG. 1 shows a synthesized (La, Nd, Sm, Eu, Gd, Dy, Ho, Y, Yb, Lu)NbO$_4$ phase. Results of scanning electron microscope (SEM) morphology and elemental energy spectrum analysis are shown in FIG. 2 and FIG. 2 shows good crystalline state and uniform element distribution of ceramics.

Embodiment 2

A-site ten-membered high-entropy fergusonite high-entropy oxide ceramic material, with a chemical formula of (La, Nd, Sm, Eu, Gd, Dy, Ho, Y, Yb, Lu)NbO$_4$, and a preparation method thereof, including following steps:

(1) weighing and proportioning raw material of La$_2$O$_3$, Nd$_2$O$_3$, Sm$_2$O$_3$, Eu$_2$O$_3$, Gd2O$_3$, Dy$_2$O$_3$, Ho$_2$O$_3$, Y$_2$O$_3$, Yb$_2$O$_3$, Lu$_2$O$_3$ and Nb$_2$O$_5$ with a purity of over 99.9% according to a composition of (La, Nd, Sm, Eu, Gd, Dy, Ho, Y, Yb, Lu)NbO$_4$, where a molar ratio of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ is 1:1:1:1:1:1:1:1:1:1;

(2) mixing the raw materials in the step (1) by wet ball milling for 6 hours, with absolute ethanol as a ball milling medium, drying and pre-sintering for 8 hours at atmospheric atmosphere of 1225° C. to obtain powders; and (3) adding binder into the powders prepared in the step (2) for granulation and dry pressing and molding, and finally sintering at atmospheric atmosphere of 1350° C. for 4 hours, where the binder is a polyvinyl alcohol solution with a mass concentration of 5%, and an addition amount of the polyvinyl alcohol accounts for 3% of a total mass of the powders.

Figure 3:
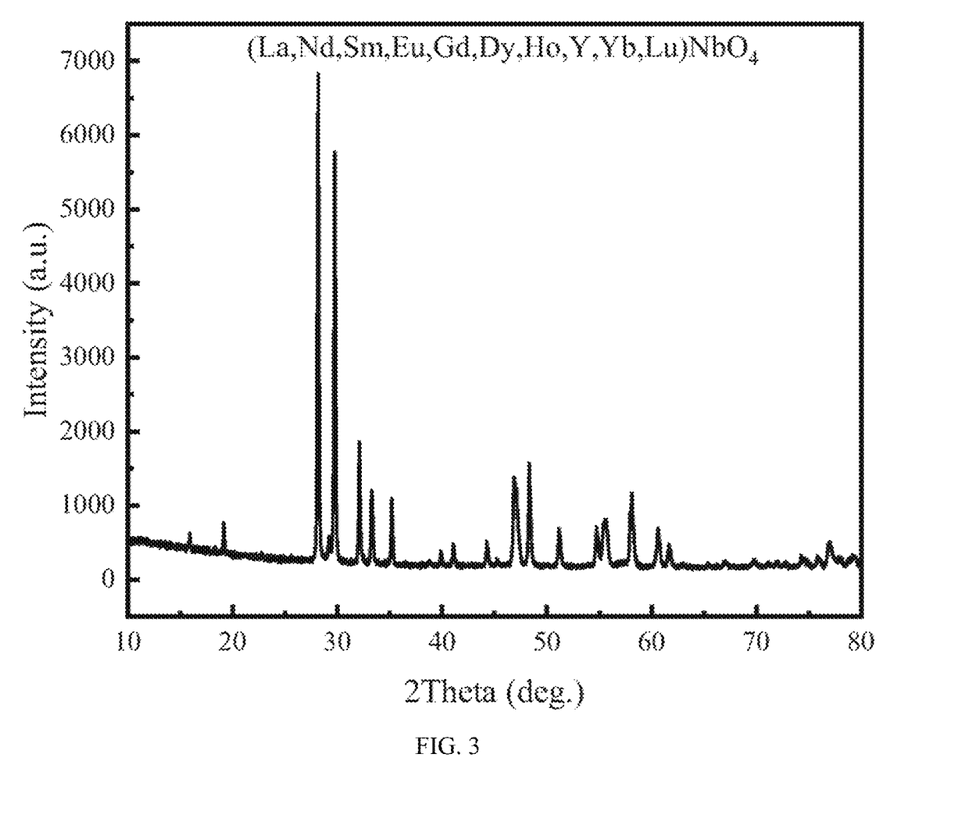
FIG. 3 is an XRD pattern of (La, Nd, Sm, Eu, Gd, Dy, Ho, Y, Yb, Lu)NbO$_4$ high-entropy oxide ceramic material in embodiment 2.

The XRD pattern of (La, Nd, Sm, Eu, Gd, Dy, Ho, Y, Yb, Lu)NbO$_4$ high-entropy oxide ceramic material prepared in embodiment 2 is shown in FIG. 3, and FIG. 3 shows a synthesized (La, Nd, Sm, Eu, Gd, Dy, Ho, Y, Yb, Lu)NbO$_4$ phase.

Comparative Example 1

A-site ten-membered fergusonite high-entropy oxide ceramic material and a preparation method thereof, including following steps:

(1) weighing and proportioning raw material of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ and Nb$_2$O$_5$ with a purity of over 99.9% according to a composition of (La, Nd, Sm, Eu, Gd, Dy, Ho, Y, Yb, Lu)NbO$_4$, where a molar ratio of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ is 1:1:1:1:1:1:1:1:1:1;

(2) mixing the raw materials in the step (1) by wet ball milling for 6 hours, with absolute ethanol as a ball milling medium, drying and pre-sintering at atmospheric atmosphere of 1200° C.

Figure 4:
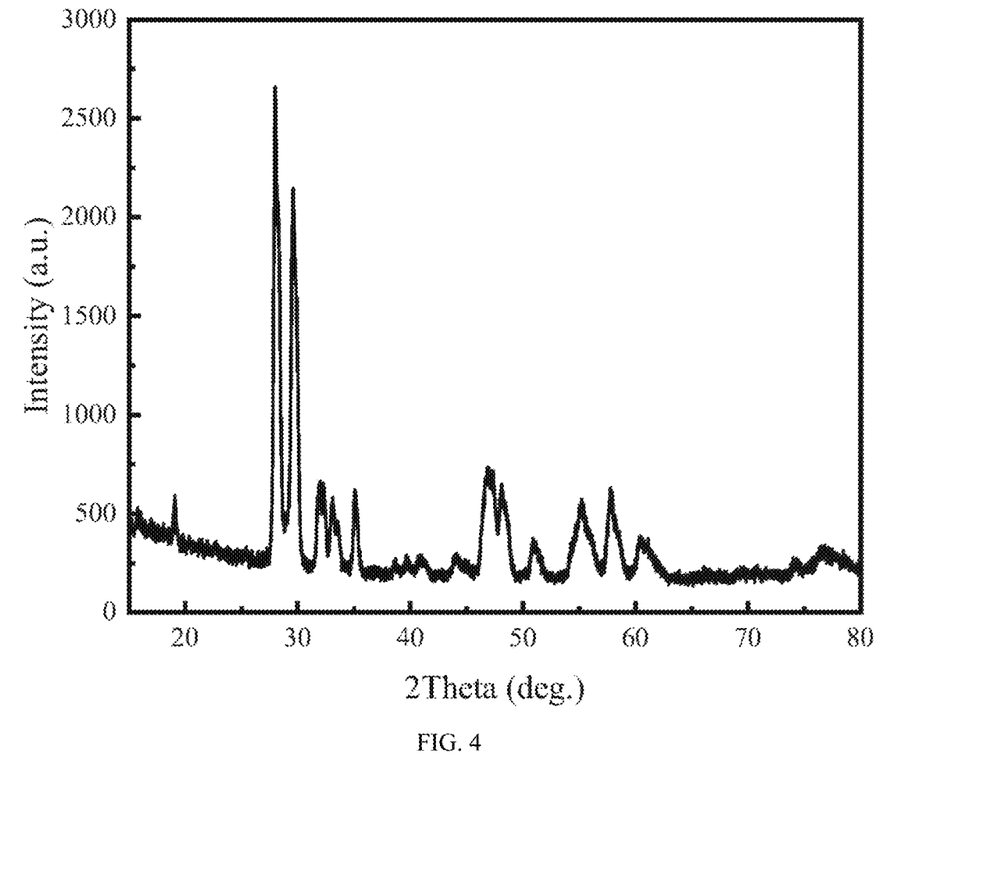
FIG. 4 is an XRD pattern of comparative example 1 (La, Nd, Sm, Eu, Gd, Dy, Ho, Y, Yb, Lu)NbO$_4$ high-entropy oxide material.

The XRD pattern of (La, Nd, Sm, Eu, Gd, Dy, Ho, Y, Yb, Lu)NbO$_4$ high-entropy oxide ceramic material prepared in comparative example 1 is shown in FIG. 4, and FIG. 4 shows a single-phase (La, Nd, Sm, Eu, Gd, Dy, Ho, Y, Yb, Lu)NbO$_4$ is not obtained by sintering at 1200° C.

Comparative Example 2

A-site ten-membered fergusonite high-entropy oxide ceramic material and a preparation method thereof, including following steps:

(1) weighing and proportioning raw material of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ and Nb$_2$O$_5$ with a purity of over 99.9% according to a composition of (La, Nd, Sm, Eu, Gd, Dy, Ho, Y, Yb, Lu)NbO$_4$, where a molar ratio of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ is 1:1:1:1:1:1:1:1:1:1;

(2) mixing the raw materials in step (1) by wet ball milling for 6 hours, with absolute ethanol as a ball milling medium, drying and pre-sintering at atmospheric atmosphere of 1300° C.

Figure 5:
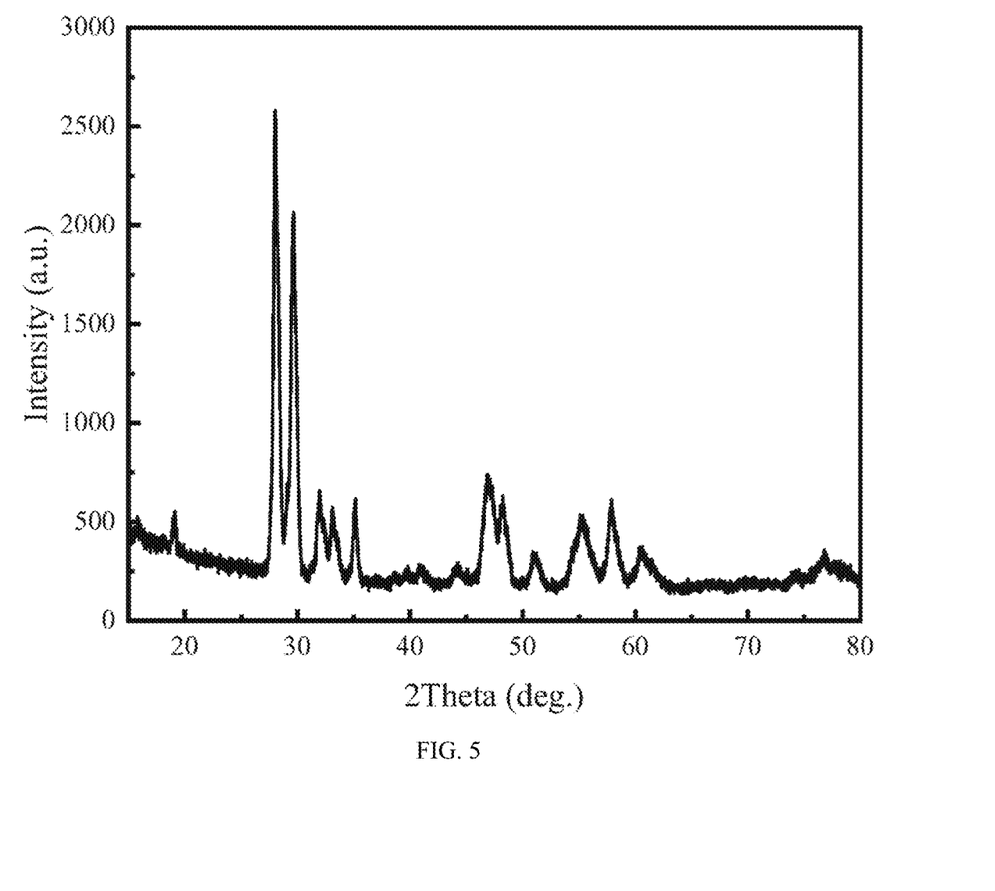
FIG. 5 is an XRD pattern of comparative example 2 (La, Nd, Sm, Eu, Gd, Dy, Ho, Y, Yb, Lu)NbO$_4$ high-entropy oxide material.

The XRD pattern of (La, Nd, Sm, Eu, Gd, Dy, Ho, Y, Yb, Lu)NbO$_4$ high-entropy oxide ceramic material prepared in comparative example 2 is shown in FIG. 5, and FIG. 5 shows a single-phase (La, Nd, Sm, Eu, Gd, Dy, Ho, Y, Yb, Lu)NbO$_4$ is not obtained by sintering at 1300° C.

Comparative Example 3

A-site ten-membered fergusonite high-entropy oxide ceramic material and a preparation method thereof, including following steps:

(1) weighing and proportioning raw material of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ and Nb$_2$O$_5$ with a purity of over 99.9% according to a composition of (La, Nd, Sm, Eu, Gd, Dy, Ho, Y, Yb, Lu)NbO$_4$, where a molar ratio of La$_2$O$_3$, Nd$_2$O$_3$, Sm$_2$O$_3$, Eu$_2$O$_3$, Gd$_2$O$_3$, Dy$_2$O$_3$, Ho$_2$O$_3$, Y$_2$O$_3$, Yb$_2$O$_3$, Lu$_2$O$_3$ is 1.5:1:1:1:1:1:1:1:1:0.5;

(2) mixing the raw materials in the step (1) by wet ball milling for 6 hours, with absolute ethanol as a ball milling medium, drying and pre-sintering at atmospheric atmosphere of 1250° C.

Figure 6:
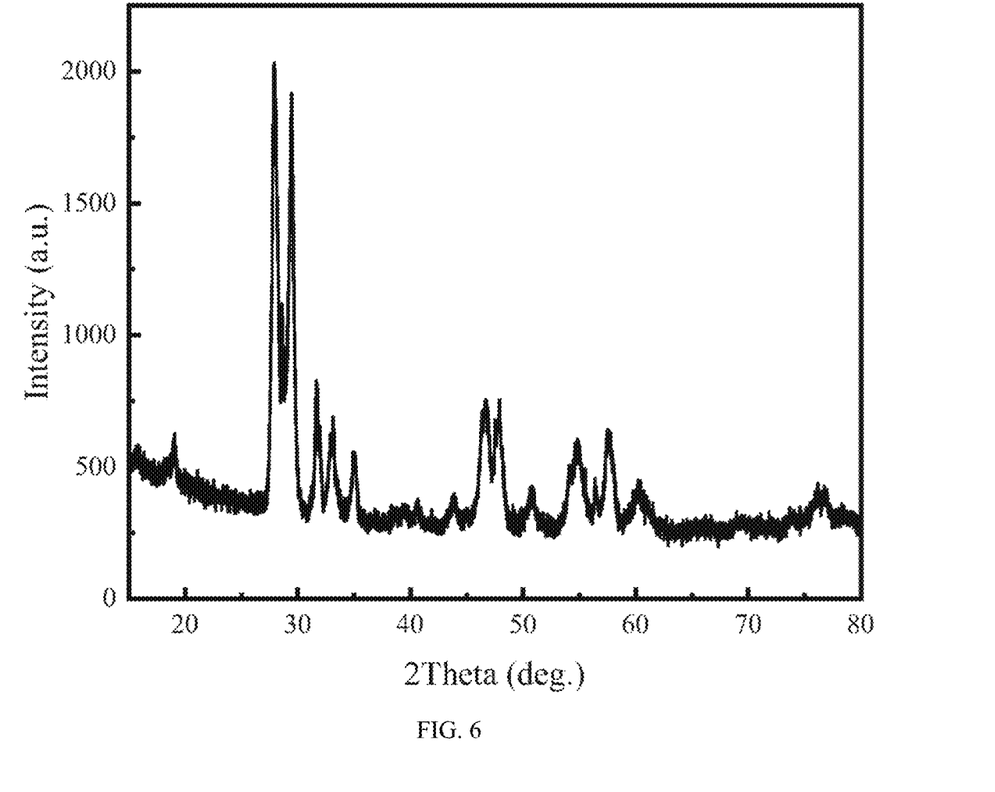
FIG. 6 is an XRD pattern of comparative example 3 (La, Nd, Sm, Eu, Gd, Dy, Ho, Y, Yb, Lu)NbO$_4$ high-entropy oxide material.

The XRD pattern of (La, Nd, Sm, Eu, Gd, Dy, Ho, Y, Yb, Lu)NbO$_4$ high-entropy oxide ceramic material prepared in comparative example 3 is shown in FIG. 6, and FIG. 6 shows the solid solubility of non-molar ratio high-entropy oxide decreases and a single-phase (La, Nd, Sm, Eu, Gd, Dy, Ho, Y, Yb, Lu)NbO$_4$ is not obtained.

The above-mentioned embodiments only describe the preferred mode of the present application, but do not limit the scope of the present application. On the premise of not departing from the design spirit of the present application, all kinds of modifications and improvements on technical schemes of the present application made by ordinary technicians in the field should fall within the scope of protection defined in the claims of the present application.

What is claimed is:

1. A ten-membered fergusonite structure high-entropy oxide ceramic, comprising a chemical structural formula of $RENbO_4$, wherein the RE is any ten rare-earth cations selected from a group consisting of $La^{3+}$, $Ce^{3+}$, $Pr^{3+}$, $Nd^{3+}$, $Sm^{3+}$, $Eu^{3+}$, $Gd^{3+}$, $Dy^{3+}$, $Ho^{3+}$, $Er^{3+}$, $Tm^{3+}$, $Yb^{3+}$, $Lu^{3+}$ and $Y^{3+}$ and occupying an RE position in an equal molar ratio, and the ten-membered fergusonite structure high-entropy oxide ceramic has a single homogeneous structure.

2. A preparation method of the ten-membered fergusonite structure high-entropy oxide ceramic according to claim 1, comprising following steps:
   (1) adding rare-earth cations in a form of rare-earth oxides, and weighing and proportioning raw material powders of the rare-earth oxides $RE_2O_3$ and $Nb_2O_5$ with a purity over 99.9% according to a composition of the $RENbO_4$;
   (2) mixing the raw materials in step (1) by wet ball milling, drying and pre-sintering at atmospheric atmosphere of 1225-1250° C. for 6-10 hours to obtain powders; and
   (3) adding binder to the powders prepared in step (2) for granulation and dry pressing and molding, and finally sintering for 2-6 hours at atmospheric atmosphere of 1350-1400° C. to obtain the ten-membered fergusonite structure high-entropy oxide ceramic.

3. The preparation method according to claim 2, wherein in the step (2), a ball milling duration is 6 hours, and ball milling mediums are absolute ethanols.

4. The preparation method according to claim 2, wherein in the step (3), the binder accounts for 3 percent (%) of a total mass of the powders prepared in the step (2).

5. The preparation method according to claim 4, wherein the binder is a polyvinyl alcohol solution with a mass concentration of 5%.

6. The preparation method according to claim 2, wherein equipment for the dry pressing and molding is a uniaxial hydraulic press, and a molding pressure is 50-80 megapascal (MPa).

7. The preparation method according to claim 2, wherein the pre-sintering in the step (2) and the sintering in the step (3) are both carried out in a muffle furnace.

* * * * *